July 15, 1952            R. G. VANCE            2,603,368
TILTING CONTROL SYSTEM FOR ROLL-CLAMPING
INDUSTRIAL LIFT TRUCKS Filed April 28, 1950            2 SHEETS—SHEET 1

INVENTOR.
ROBERT G. VANCE
BY
*Fay, Golrick & Fay*
ATTORNEYS

July 15, 1952

R. G. VANCE 2,603,368

TILTING CONTROL SYSTEM FOR ROLL-CLAMPING
INDUSTRIAL LIFT TRUCKS

Filed April 28, 1950

INVENTOR.
ROBERT G. VANCE

BY Fay, Golrick & Fay
ATTORNEYS

Patented July 15, 1952

2,603,368

UNITED STATES PATENT OFFICE 2,603,368

TILTING CONTROL SYSTEM FOR ROLL-CLAMPING INDUSTRIAL LIFT TRUCKS

Robert G. Vance, Maple Heights, Ohio, assignor to The Elwell-Parker Electric Company, Cleveland, Ohio, a corporation of Ohio Application April 28, 1950, Serial No. 158,800

5 Claims. (Cl. 214—66)

This invention relates to control systems in industrial lift trucks, and particularly to tilting lift trucks of the roll clamping and roll rotating type.

An object of this invention is to provide a control system which allows the rotation of the load carrier only when the carrier has the load elevated to a predetermined level at which neither carrier nor load will be damaged upon rotation by collision with the floor.

Another object is to provide a control system by which the load may be rotated through a predetermined arc without the necessity of specific actuation of the controls by the operator to stop the rotation at the desired position.

Another object is to provide a control system by which the tilting of the upright frame of the truck is automatically confined within a predetermined safe limit after the load carrier has risen to a predetermined height.

Another object is to provide a control system whereby the upright frame may be tilted through a predetermined arc without specfic activation of the controls by the operator to stop the tilting at the desired position.

Still further objects and advantages will appear in the following description, and drawings in which.

Figure 1:
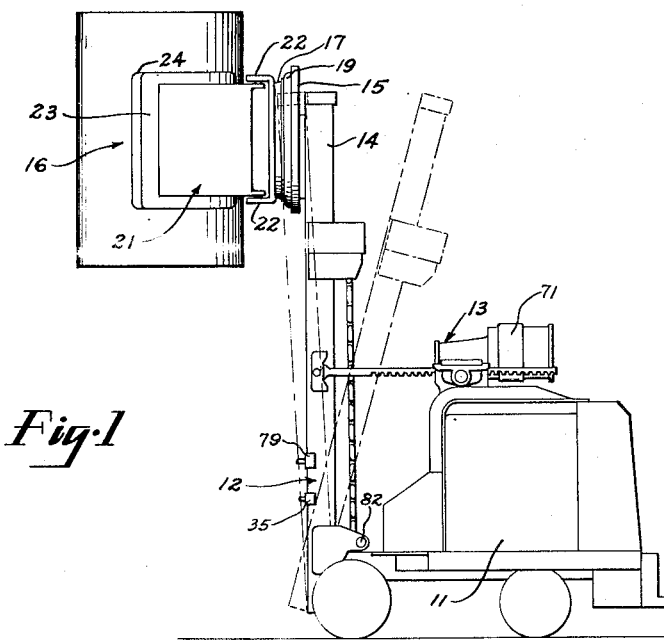
Fig. 1 is a side view (in gross) of an industrial lift truck of the type having a tiltable telescoping upright frame and rotatable clamp, the clamp and frame being shown in an elevated position with a roll held in a vertical position.

The roll-clamping lift truck shown in Fig. 1 is of the electrically powered type. It comprises the truck body and chassis, generally indicated by reference numeral 11, a frame 12, tiltably mounted on the body, an electric motor powered mechanism 13 by which the frame is tilted forward or backward, an upright frame 14 telescoping in frame 12, a carriage 15 movably mounted in the elevatable frame 14, and a hydraulically operated roll clamp, indicated generally at 16, rotatably mounted on the carriage. Means (not shown) for moving the carriage 15 in the frame 14 and for elevating the frame are provided. Likewise, not shown are the batteries and the means provided for rotating the clamp with respect to the carriage.

A hydraulic system is provided for operating the clamp, and a control system for the operation of the clamp, the clamp rotating device, and carriage and frame elevating mechanism, and the tilting mechanism to be described hereinafter are also provided on the truck. The truck may be propelled and controlled in its vehicular movements by any of the conventional means.

The roll clamp mechanism has a base plate 17 rotatably mounted on a corresponding plate 19 borne by carriage 15, a fixed jaw 20 affixed to the base plate and a movable jaw 21, slidable on the fixed jaw within side pieces 22 thereof. Curved face pieces 23 of the jaws are provided interiorly with friction surfaces 24 to aid in holding the rolls. These friction surfaces may be of rubber or some other suitable material. The jaw 21 is moved toward or away from jaw 20 by hydraulic cylinders mounted between the jaws. The mechanism rotating the clamp assembly is adapted to position the clamp with the fixed jaw edge horizontal and below the movable jaw for picking up a roll lying on its side, and then to rotate the clamp through 90° so that the roll is axially vertical for tiering. As the rotating mechanism, as such, forms no part of the present invention, it is not described here in detail.

Figure 2:
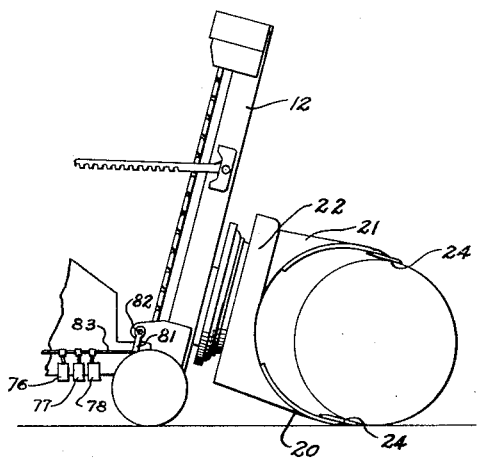
Fig. 2 is a partial side view of the truck with clamp and frame in position for picking up of roll lying on its side.

To pick up the roll lying on its side, the clamp is rotated so that the jaws are parallel to the floor or surface on which the roll rests, with the fixed jaw nearest the floor, as shown in Fig. 2. The upright frame is generally tilted forward, so that as the truck is advanced toward the roll, the fixed jaw meets the roll slightly behind the line of contact between roll and floor, and then the clamp is closed to hold the roll tightly, before elevating it. When a vertical roll is to be picked up, the frame is not tilted and the clamp is of course positioned with the jaws vertical.

To prevent damage to the clamp or to a roll held therein, rotation of the clamp must be possible only when the clamp is above a certain minimum height. Hence there is provided the control system for the clamp rotating motor, shown in Fig. 3, which also incorporates rotation limiting means, so that when the extreme of desired rotation is reached, the roll clamp automatically stops at either vertical or horizontal position if the rotation controller is just held in the desired operating position.

After a roll has been grasped in the clamp, the upright frame it tilted backwards beyond the vertical to give the floor clearance that may be needed at ramps or similar places in the path of the truck. Thus with one design of truck and clamp jaws, a 15° forward tilt is used in picking up horizontal rolls and a 15° backward tilt for carrying clearance. Such a backward tilting, to obtain necessary clearances in truck travel, is preferable to simply elevating the load, for truck stability in travel is more certain under all conditions the lower the load. When a roll is to be placed in a new location in a horizontal position, the upright frame is tilted slightly forward—for example, about 3° with one jaw design—to facilitate releasing and depositing the roll when the clamp is opened.

Figure 4:
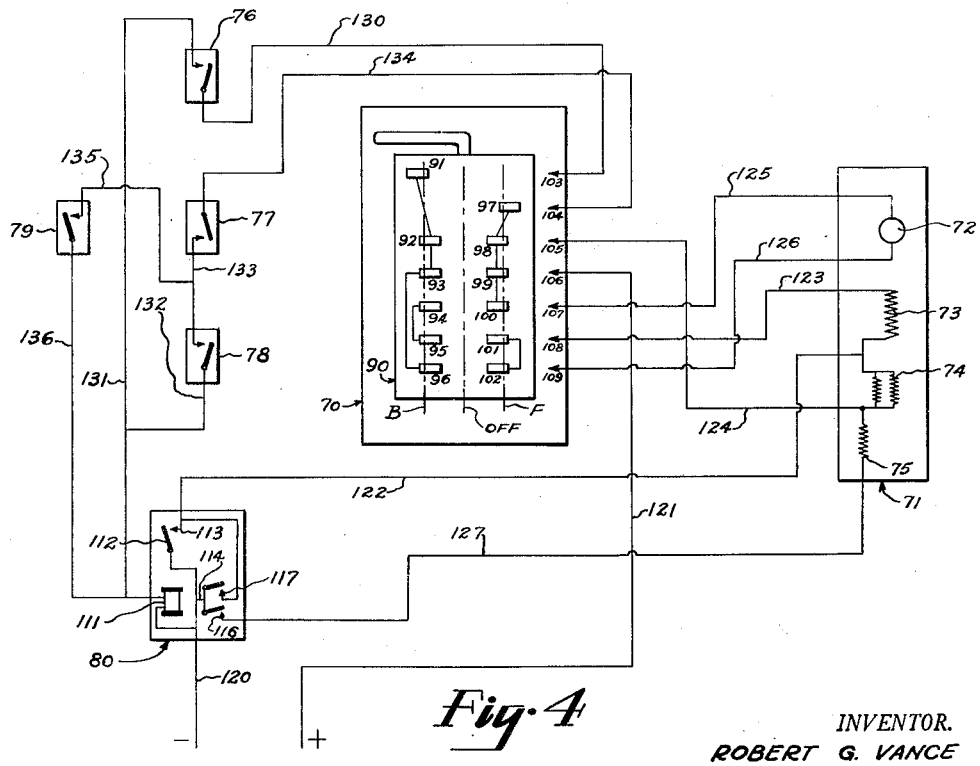
Fig. 4 is the mechanical-electrical control circuit for the tilting movement of the elevatable frame.

From a safety standpoint it is of particular importance that, when loaded, the load not be elevated beyond a certain point and tilted forward beyond a certain angle, lest the truck become unstable. Hence, a tilting control system is provided which, after the clamp is elevated to a certain height determined by the design of the truck, will not allow the upright frame to be tilted forward more than the small angle needed to release the roll. Such a tilting control system is shown in Fig. 4. This system also has the advantages of stopping the forward tilting at the angle needed for picking up horizontal rolls, the backward tilting at the carrying angle, and when the frame is elevated, at the small forward tilt needed for release of a horizontal roll. The angles specified in this description are, of course, merely exemplary.

Figure 3:
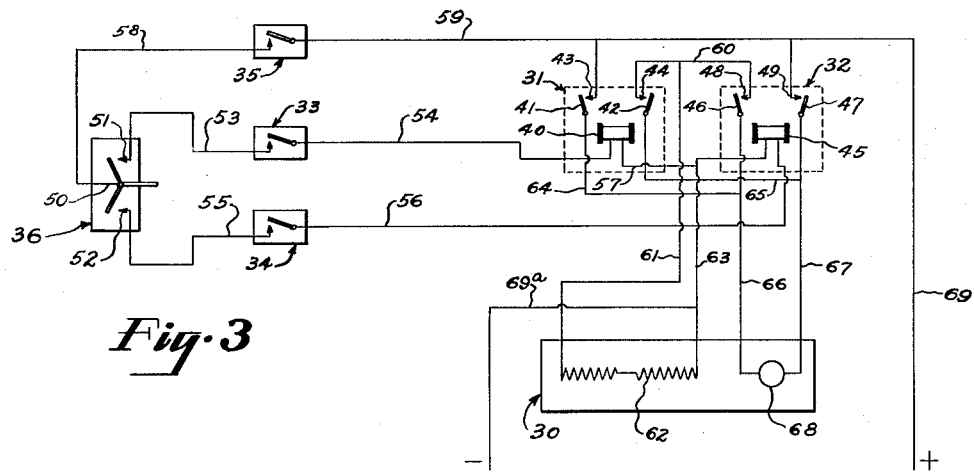
Fig. 3 is the mechanical-electrical control circuit for the rotational movement of the roll clamp.

The aforementioned rotation control system, shown in Fig. 3, comprises a motor 30 to operate the clamp rotating mechanism suitably connected thereto, a pair of contactor boxes 31 and 32 for connecting the motor leads for operation in opposite directions, say left and right rotation respectively; two normally closed rotation limit switches 33 and 34 for stopping rotation to left and right respectively, a normally closed height limit switch 35 to prevent any rotation when the clamp is too low for rotation without damage to clamp or load; and a manually operated rotation controller 36, which is mounted at the operator's station on the truck. The switch 35 is preferably mounted on the upright frame 12 at such a height that the clamp carriage will actuate it from its normally closed position to an open position when the clamp is too low for safe rotation. The rotation limit switches 33 and 34 may be mounted on fixed plate 19 for operation to open position by suitably positioned cams carried by rotatable plate 17. The precise location and camming mechanism for these switches are not shown as these are merely matters of design convenience.

In the contactor box 31 the solenoid coil 40, when energized, brings the movable contacts 41 and 42, which are mechanically linked, in contact with the corresponding fixed contacts 43 and 44. Similar contactor box 32 has a solenoid coil 45, movable contacts 46 and 47 and fixed contacts 48 and 49. The contactor arm 50 of the rotation controller 36 can be moved from a neutral position to either contact 51 for left rotation or contact 52 for right rotation. One side of rotation limit switch 33 is connected to contact 51 by conductor 53, while the other side is connected by conductor 5 to solenoid coil 40. Conductors 55 and 56 in a similar manner connect rotation limit switch 34 respectively, to contact 52 and solenoid 45. The other end of solenoids 40 and 45 are joined by conductor 57.

One side of height limit switch 35 is connected by conductor 58 to controller contact arm 50, and the other side by conductor 59 to fixed contacts 43 and 49 of the contact boxes. The other fixed contacts 44 and 48 are bridged by conductors 60, which is connected by 61 to one side of motor field 62, the other side of which is connected to conductor 57 by 63. Movable contact 41 is connected to movable contact 46 by conductor 64, while movable contacts 42 and 47 are connected by 65. The leads 66 and 67 of motor armature 68 are connected respectively to conductors 64 and 65. The positive and negative power leads 69 and 69a are connected respectively to conductors 59 and 63.

With this control circuit, as long as the clamp is below the minimum height for safe rotation, since switch 35 is then mechanically held open, the positive power line to the controller is open and no current can flow in the control circuit through the solenoids 40 or 45 to close the motor circuit contacts in the conductor boxes, no matter how the controller 36 is set. When the clamp is above the minimum safe height, switch 35 is closed, so that if the controller is normally operated to bring contact arm 50 against, for example, contact 51 to rotate the clamp to the left, then current will flow through conductors 69 and 59, switch 35, conductor 58, controller 36, conductor 53, switch 33, conductor 54, solenoid 40, and conductors 57, 63 and 69a. The current flowing in this left rotation control circuit energizes solenoid 40 to bring movable contacts 41 and 42 against contacts 43 and 44 of the motor control circuit, thereby allowing current to flow through conductors 69, 59, 64 and 66, the armature, the conductors 67, 65, 60, 61, the field 62, the conductors 63 and 69a, to operate the motor. If the controller arm 50 is merely held in position against contact 51, the clamp will be rotated to the desired position for which limit switch 33 is set, whereupon 33 is mechanically opened by a cam or other means known to the art, thereby opening the left rotation control circuit to deenergize solenoid 40 and so release movable contactors 41 and 42 to the opening bias thereof, thereby opening the motor circuit. If it is desired to rotate the clamp back again the contactor arm 50 is brought against contact 52, and a similar current flow through solenoid 45 in the right rotation control circuit closes movable contacts 46 and 47 upon 48 and 49, again to cause current to flow in the motor circuit, but with this difference, as is readily seen, that the direction of current through the armature is reversed from what it was for left rotation. Hence the motor rotation is reversed. As soon as the right rotation begins, the left rotation limit switch 33 again closes in readiness for left rotation control when needed. A normally closed motor brake electromagnetically operated by a solenoid coil in series with the field may be provided, so that immediately as the motor current flows the brake is released, and as the motor current ceases the brake is applied to get exact positioning of the clamp when the rotation limit switches are actuated.

The tilting motor operating circuit and tilt control circuit of this invention, shown in Fig. 4, include a drum type manual controller 70; a motor 71, here shown as a compound wound motor having an armature 72, a series field 73, a shunt field 74, and a solenoid coil 75 for releasing a normally applied motor brake; a 15° backward tilt limit switch 76, a 15° forward tilt limit switch 77, a 3° forward tilt limit switch 78, a clamp height controlled forward tilt cut-out switch 79, and a motor control contractor box 80. The tilt limit switches 76, 77 and 78, all of a normally closed type, may be mounted on the truck chassis for operation by any suitable mechanical linkage connected to the upright frame. In Fig. 2 there is shown one such means of operating these limit switches, comprising an arm 81 carried on the pivot shaft 82 of the tiltable upright frame 12, and a horizontal cut-out rod 83, bearing three lugs projecting therefrom to operate the limit switches. Each lug in the rod is so adjusted in position that as the rod 83 moves correspondingly to the tilting of upright frame 12, switch 76 is opened at 15° backward tilt, switch 77 at 15° forward tilt, and switch 78 at 3° forward tilt. Switch 79, normally open, may be mounted on upright frame 12 to be held closed by a camming action of the clamp carriage 15 as long as the clamp is at a height which is safe for 15° forward tilt, similarly to the manner in which normally closed switch 35 in the rotation control circuit is held open when the roll clamp carriage is at unsafe operating heights.

In the drum controller 70, the drum 90 is provided with two sets of contact segments, one set 91-96 for back tilting, and the other 97-102 for forward tilting, and a series of fingers 103-109, which are in contact with the drum. These segments are conductively connected in the following groups, 91, 92, 93, and 96; 94 and 95; 97, 98, 99 and 100; 101 and 102. When the controller is in the "off" position, the fingers contact none of the segments but lie between the two sets of segments. However, when the controller is in operating position, fingers 105, 106, 107, 108 and 109 are in contact respectively with segments 92, 93, 94, 95 and 96 for back tilting, and 98, 99, 100, 101 and 102 for forward tilting; while finger 103 contacts only segment 91, and finger 104 only segment 97, for back and forward tilt respectively. Segments 91 and 97 are displaced somewhat from the line of position of the rest of the segments of the sets to which they belong, resulting in a contact with their corresponding fingers which is delayed somewhat after the initial contacts of the fingers with the rest of the segments in each set. In the motor control contactor box 80, solenoid coil 111, when energized, moves contact 112 against fixed contact 113, and contact 114 against the fixed contact pair 116 and 117. One end of coil 111 is internally connected internally of the box to contact 112, while contact 113 is similarly connected to contact 117. The negative power line 120 is connected to the one end of coil 111 commonly with 112, while positive power lead 121 is connected to finger 106. Conductor 122 joins contact 113 to one end of motor series field 73 and shunt field 74 commonly, while the other end of these fields are connected respectively to fingers 108 and 105 by conductors 123 and 124. The motor armature leads 125 and 126 are connected to fingers 107 and 109. One end of the motor brake releasing solenoid 75 is connected to conductor 124 and the other by conductor 127 to contact 116. The back tilt limit switch 76 is connected by conductors 130 and 131 respectively, to finger 103 and the solenoid coil 111. The 3° forward tilt switch 78 is connected on one side by conductor 132 to 131, on the other by 133 to the 15° forward tilt switch 77, which in turn is connected by 134 to finger 104. The switch 79 is connected to conductor 133 by 135, and by 136 to the solenod coil 111 commonly with conductor 131.

From Fig. 4 of the drawings and the above description of the wiring, it is readily seen that the sole change in the motor power circuit, when the controller is moved from one operating position to the other, is the reversal of armature polarity with a consequent reversal of motor rotation and hence of tilting motion. When the controller is set for back tilting, current kows in conductor 121, through the controller by finger 106, segments 93 and 91, and finger 103, through reverse tilt limit switch 76 and thence through solenoid coil 111, thereby energizing it, and out 120. When coil 111 is energized it brings contact 112 against 113 to close the motor circuit, and contact 114 against 116 and 117 to close the brake solenoid coil circuit to release the motor brake. With the controller held in backward tilt position the motor then tilts the upright frame 12 until switch 76 is opened by its lug on rod 83, thereby opening the back tilt control circuit to de-energize coil 111, thereby allowing contact 112 to be withdrawn from 113 to open the motor circuit, and also to allow contact 114 to move away from 116 and 117, thereby opening the brake releasing circuit to de-energize brake solenoid 75, and hence to apply the motor brake.

The forward tilt control action, braking and motor operation is similar except for the above mentioned reversal of armature polarity, as long as the clamp is below the maximum safe height for 15° forward tilt. In that case switch 79, being held closed by the clamp carriage 15, bridges the 3° forward tilt switch 78, so that when switch 78 is opened by cut-off rod 83, the forward tilt control circuit is not opened. Thus the forward tilting continues, the controller being held in position for forward tilting, until 15° forward tilt limit switch 77 opens, thereby stopping the tilting just as the opening of switch 76 does. When the clamp is above the maximum safe height for extreme forward tilting, the height switch 79 is no longer held closed, and the current in the forward tilt control circuit all must pass through the 3° forward tilt limit switch to energize coil 111. Hence, as soon as a 3° forward tilt is reached, switch 78 is opened by rod 83, thereby de-energizing coil 111 to stop tilting as when switches 76 or 77 are opened.

The first result of this arrangement is that the 15° forward tilt can be obtained only when the roll clamp is below a level safe with respect to truck stability above which only a maximum of 3° forward tilt can be had, and secondly, the maximum tilt that may be obtained for the clamp position at a given height may be had simply by merely holding the controller 70 in forward or rearward tilt position until tilting automatically stops. The exact values of tilt limits given above are matter of design consideration for a particular truck and so also the motor and motor brake types and connections.

I claim:

1. In a tilting lift frame type tier lift industrial truck having a motor to power the tilting mechanism, a motor operating circuit including a motor reversing controller and a solenoid operated motor circuit switch; a tilting control system comprising a backward tilt control circuit and a forward tilt control circuit, said back tilt control circuit including the solenoid of said motor circuit switch, a normally closed backward tilt limiting switch operable to open position by the tiltable frame and a back tilt control switch on said reversing controller, and said forward tilt control circuit including in series the solenoid of said motor switch, a normally closed forward tilt limit switch, a second normally closed forward tilt limit switch operable to open at a smaller angle of tilt than the first named forward tilt limit switch, and a forward tilt control switch in said reversing controller, said forward tilt control circuit also including a cut-off switch in parallel with said second forward limit switch, said cut-off switch being operable to open position when the load is above a safe height for extreme forward tilting.

2. In a tier lift industrial truck having a tiltable upright frame, a tilting control and operating system comprising an electric motor to power the tilting mechanism, a motor operating circuit; a controller mechanism for reversing the motor armature connections with respect to the field in the motor operating circuit to change the direction of motor rotation for backward and forward tilting, a solenoid operated motor switch in the motor operating circuit, the solenoid of said switch being connected to the line side of said switch; a backward tilt control circuit including in series a back tilt control switch in said controller, a normally closed backward tilt limit switch and the solenoid of said motor switch; a forward tilt control circuit including a forward tilt control switch in said controller, a normally closed extreme forward tilt limit switch, a second normally closed forward tilt limit switch operable to an open position at a smaller angle of tilt than the first named forward tilt limit switch, and the solenoid of said motor switch, said forward tilt control circuit including a cut-off switch in parallel with said second forward limit switch, said cut-off switch being operable to open position when the load carriage of the truck is above a height safe for extreme forward tilting.

3. In a tilting control and operating system such as that described in claim 2, a control circuit for controlling a normally applied solenoidally released motor brake for the tilting motor, said circuit including the solenoid of said brake and a brake switch in series therewith operated by the said motor switch solenoid.

4. In a tier lift industrial truck having a tiltable upright frame, a tilting control and operating system comprising an electric motor to power the tilting mechanism; a motor operating circuit; a controller mechanism for reversing the motor armature connections with respect to the field in the motor operating circuit to change the direction of motor rotation for backward and forward tilting, said controller also serving to connect one side of the power input line to the motor operating circuit; a solenoid operated motor switch in the other side of the power input line of the motor operating circuit, the solenoid of said switch being connected to the line side of said switch; a backward tilt control circuit including a back tilt control switch in said controller, a normally closed backward tilt limit switch and the solenoid of said motor switch; a forward tilt control circuit including a forward tilt control switch in said controller, a normally closed extreme forward tilt limit switch, a second normally closed forward tilt limit switch operable in an open position at a smaller angle of tilt than the first named forward tilt limit switch, a cut-off switch in parallel with said second forward limit switch, said cut-off switch being operable to open position when the load carriage of the truck is above a height safe for extreme forward tilting, and the solenoid of said motor switch; and mechanical means for operating said tilt limit switches, said means comprising an arm mounted on the pivot for the tiltable frame of said truck, said arm moving with said frame, a rod mounted adjacent said switches and linked to said arm to move therewith, and projecting lugs on said rod, each of said lugs being positioned to open one of said switches at the desired angle of tilt.

5. In a tier lift industrial truck of the roll clamping and rotating type, having an electrical motor powered clamp rotating mechanism, a rotation control system comprising a manually operated controller switch having a contact arm, a contact for forward rotation, and a contact for reverse rotation; a solenoid operated contactor for operating the motor in a forward rotating direction and a solenoid operated contactor for operating the motor in a reverse direction, the solenoids of said contactors being in series relation, with their common point connected to one side of the power input lines; a normally closed forward rotation limiting switch connecting the forward rotation contact of said controller and one side of the forward rotation solenoid; a normally closed reverse rotation limiting switch connecting the reverse rotation contact of said controller and one side of the reverse rotation solenoid; and a cut-off switch connected to said controller contact arm and to the second side of the power input lines, said cut-off switch being held open mechanically by the clamp carriage when the clamp is below a height necessary for rotation clear of the truck supporting surface.

ROBERT G. VANCE.

REFERENCES CITED

The following references are of record in the file of this patent:

UNITED STATES PATENTS

| Number | Name | Date |
| --- | --- | --- |
| 1,538,168 | Cochran | May 19, 1925 |
| 1,855,068 | Remde | Apr. 19, 1932 |
| 2,072,747 | Freese | Mar. 2, 1937 |
| 2,272,431 | Rankin | Feb. 10, 1942 |
| 2,287,469 | Cochran | June 23, 1942 |
| 2,307,544 | Robinson | Jan. 5, 1943 |
| 2,541,268 | Milz | Feb. 13, 1951 |